(12) United States Patent
Wei et al.

(10) Patent No.: US 10,152,627 B2
(45) Date of Patent: Dec. 11, 2018

(54) FEATURE FLOW FOR VIDEO RECOGNITION

(71) Applicant: Microsoft Technology Licensing, LLC, Redmond, WA (US)

(72) Inventors: Yichen Wei, Beijing (CN); Lu Yuan, Beijing (CN); Jifeng Dai, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/463,491

(22) Filed: Mar. 20, 2017

(65) Prior Publication Data

US 2018/0268208 A1    Sep. 20, 2018

(51) Int. Cl.
*G06K 9/00* (2006.01)
*G06K 9/46* (2006.01)

(52) U.S. Cl.
CPC ..... *G06K 9/00335* (2013.01); *G06K 9/00744* (2013.01); *G06K 9/00805* (2013.01); *G06K 9/4671* (2013.01)

(58) Field of Classification Search
None
See application file for complete search history.

(56) References Cited

U.S. PATENT DOCUMENTS 4,611,347 A    9/1986 Netravali et al.
9,449,230 B2    9/2016 Han et al.
9,456,131 B2    9/2016 Tran
2013/0121577 A1*    5/2013 Wang ........................ G06T 7/20
382/173

(Continued)

FOREIGN PATENT DOCUMENTS

CN    104463869 A    3/2015
CN    105160310 A    12/2015

(Continued)

OTHER PUBLICATIONS

Su, et al., "Transfer Learning for Video Recognition with Scarce Taining Data for Deep Convolutional Neural Network", In Journal of Computing Research Repository, Sep. 2014, pp. 1-12.

(Continued)

*Primary Examiner* — Delomia L Gilliard
(74) *Attorney, Agent, or Firm* — Schwegman Lundberg & Woessner, P.A.

(57) ABSTRACT

Various embodiments herein each include at least one of systems, methods, and software for feature flow for video recognition. Such embodiments generally include a fast and accurate framework for video recognition. One example method includes receiving a first frame captured by an imaging device and designating the first frame as a key frame. The method may then generate at least one feature map to identify features in the key frame and subsequently receive a second frame. The method also includes designating the second frame as a current frame and applying a flow estimation algorithm to the key frame and current frame to generate a flow field representing a flow from the key frame to the current frame. The method then propagates each of the at least one feature maps based on the flow field to approximate current locations of features identified within each of the at least one feature maps.

17 Claims, 5 Drawing Sheets

(56) References Cited

U.S. PATENT DOCUMENTS

| | | | | |
|---|---|---|---|---|
| 2013/0251274 | A1* | 9/2013 | Xie | G06K 9/00751 382/218 |
| 2014/0201126 | A1 | 7/2014 | Zadeh et al. | |

FOREIGN PATENT DOCUMENTS

| | | |
|---|---|---|
| CN | 105550699 A | 5/2016 |
| CN | 105844239 A | 8/2016 |

OTHER PUBLICATIONS

"Unleash the Power of Big Data Analytics and Machine Learning", https://www.codeproject.com/articles/1151600/unleash-the-power-of-big-data-analytics-and-machin, Published on: Nov. 3, 2016, 11 pages.

Alfaro, et al., "Action Recognition in Video Using Sparse Coding and Relative Features", In Proceedings of IEEE Conference on Computer Vision and Pattern Recognition, Jun. 27, 2016, 10 pages.

Ma, et al., "Nonparametric Scene Parsing with Deep Convolutional Features and Dense Alignment", In Proceedings of IEEE International Conference on Image Processing, Sep. 27, 2015, pp. 1915-1919.

Simonyan, et al., "Two-Stream Convolutional Networks for Action Recognition in Videos", In Proceedings of Annual Conference on Neural Information Processing Systems, Dec. 8, 2014, 9 pages.

Li, et al., "Video Motion Estimation with Temporal Coherence", In Proceedings of the 10th International Conference on Virtual Reality Continuum and Its Applications in Industry, Dec. 11, 2011, pp. 315-320.

Bai, et al., "Exploiting semantic information and deep matching for optical flow", In Proceedings of 14th European Conference on Computer Vision, Oct. 11, 2016, pp. 1-16.

Brox, et al., "High accuracy optical flow estimation based on a theory for warping", In Proceedings of 8th European Conference on Computer Vision, May 2004, 12 pages.

Brox, et al., "Large displacement optical flow: Descriptor matching in variational motion estimation", In Journal of IEEE Transactions on Pattern Analysis and Machine Intelligence, vol. 33, Issue 3, Mar. 2011, pp. 1-14.

Chen, et al., "Semantic image segmentation with deep convolutional nets and fully connected CRFs", In Proceedings of International Conference on Learning Representations, May 2015, pp. 1-14.

Chen, et al., "DeepLab: Semantic Image Segmentation with Deep Convolutional Nets, Atrous Convolution, and Fully Connected CRFs", In Proceedings of Computer Vision and Pattern Recognition, Dec. 30, 2016, pp. 1-14.

Cordts, et al., "The cityscapes dataset for semantic urban scene understanding", In proceedings of IEEE Conference on Computer Vision and Pattern Recognition, Jun. 27, 2016, pp. 1-29.

Dai, et al., "R-FCN: Object detection via region-based fully convolutional networks", In Proceedings of Annual Conference on Neural Information Processing Systems, Dec. 5, 2016, pp. 1-11.

Dosovitskiy, et al., "Flownet: Learning optical flow with convolutional networks", In Proceedings of International Conference on Computer Vision, Dec. 11, 2015, pp. 2758-2766.

Fayyaz, et al., "STFCN: Spatio-Temporal FCN for Semantic Video Segmentation", In Journal of Computing Research Repository, Aug. 2016, pp. 1-7.

Galasso, et al., "A unified video segmentation benchmark: Annotation, metrics and analysis", In Proceedings of International Conference on Computer Vision, Dec. 1. 2013, pp. 3527-3534.

Girshick, Ross, "Fast R-CNN", In Proceedings of International Conference on Computer Vision, Dec. 11, 2015, 9 pages.

Girshick, et al., "Rich feature hierarchies for accurate object detection and semantic segmentation", In Proceedings of the IEEE Conference on Computer Vision and Pattern Recognition, Jun. 23, 2014, pp. 1-21.

He, et al., "Spatial pyramid pooling in deep convolutional networks for visual recognition", In Proceedings of European Conference on Computer Vision, Sep. 6, 2014, pp. 1-14.

He, et al., "Deep residual learning for image recognition", In Proceedings of IEEE Conference on Computer Vision and Pattern Recognition, Jun. 27, 2016, pp. 770-778.

Horn, et al., "Determining optical flow", In Journal of Artificial Intelligence, vol. 17, Issue 1-3, Aug. 1981, pp. 185-203.

Hur, et al., "Joint optical flow and temporally consistent semantic segmentation", In Proceedings of European Conference on Computer Vision Workshops, Oct. 3, 2016, pp. 1-14.

Ioffe, et al., "Batch normalization: Accelerating deep network training by reducing internal covariate shift", In Proceedings of international conference on machine learning, Jul. 6, 2015, 9 pages.

Jayaraman, et al., "Slow and steady feature analysis: higher order temporal coherence in video", In Proceedings of IEEE Conference on Computer Vision and Pattern Recognition, Jun. 27, 2016, pp. 1-6.

Kang, et al., "T-CNN: Tubelets with convolutional neural networks for object detection from videos", In Proceedings of IEEE Conference on Computer Vision and Pattern Recognition, Jun. 27, 2016, pp. 1-9.

Krizhevsky, et al., "Imagenet classification with deep convolutional neural networks", In Proceedings of 26th Annual Conference on Neural Information Processing Systems, Dec. 3, 2012, pp. 1-9.

Kundu, et al., "Feature space optimization for semantic video segmentation", In Proceedings of IEEE Conference on Computer Vision and Pattern Recognition, Jun. 27, 2016, pp. 1-8.

Lee, et al., "Multi-class multi-object tracking using changing point detection", In Journal of Computing Research Repository, Aug. 2016, pp. 1-16.

Liu, et al., "SIFT Flow: Dense Correspondence across Different Scenes", In Proceedings of 10th European Conference on Computer Vision, Oct. 12, 2008, pp. 28-42.

Long, et al., "Fully convolutional networks for semantic segmentation", In Proceedings of IEEE Conference on Computer Vision and Pattern Recognition, Jun. 7, 2015, pp. 1-10.

Silberman, et al., "Indoor Segmentation and Support Inference from RGBD Images", In Proceedings of European Conference on Computer Vision, Oct. 7, 2012, pp. 1-14.

Ouyang, et al., "DeepID-Net: Deformable Deep Convolutional Neural Networks for Object Detection", In Proceedings of the IEEE Conference on Computer Vision and Pattern Recognition, Jun. 7, 2015, pp. 2403-2412.

Ranjan, et al., "Optical flow estimation using a spatial pyramid network", In Journal of the Computing Research Repository, Nov. 2016, pp. 1-10.

Ren, et al., "Faster R-CNN: Towards real-time object detection with region proposal networks", In Proceedings of Advances in Neural Information Processing Systems, Dec. 7, 2015, pp. 1-9.

Revaud, et al., "EpicFlow: Edge-Preserving interpolation of Correspondences for Optical Flow", In Proceedings of IEEE Conference on Computer Vision and Pattern Recognition, Jun. 7, 2015, pp. 1164-1172.

Russakovsky, et al., "imageNet Large Scale Visual Recognition Challenge", In International Journal of Computer Vision, vol. 115, Issue 3, Dec. 2015, pp. 1-43.

Sevilla-Lara, et al., "Optical flow with semantic segmentation and localized layers", In Proceedings of IEEE Conference on Computer Vision and Pattern Recognition, Jun. 27, 2016, pp. 1-10.

Shelhamer, et al., "Clockwork convnets for video semantic segmentation", In Proceedings of Computer Vision Workshop, Oct. 8, 2016, 16 pages.

Simonyan, et al., "Very deep convolutional networks for large-scale image recognition", In Journal of the Computing Research Repository, Sep. 2014, pp. 1-14.

Sun, et al., "Dl-sfa: deeply-learned slow feature analysis for action recognition", In Proceedings of IEEE Conference on Computer Vision and Pattern Recognition, Jun. 23, 2014, pp. 4321-4328.

Szegedy, et al., "Going deeper with convolutions", In Proceedings of IEEE Conference on Computer Vision and Pattern Recognition, Jun. 7, 2015, pp. 1-9.

(56) References Cited

OTHER PUBLICATIONS

Szegedy, et al., "Rethinking the inception architecture for computer vision", In Proceedings of IEEE Conference on Computer Vision and Pattern, Jun. 27, 2016, pp. 1-10.
Weickert, et al., "A survey on variational optic flow methods for small displacements", In Publication of Springer, 2006, pp. 103-136.
Weinzaepfel, et al., "DeepFlow: Large displacement optical flow with deep matching", In Proceedings of IEEE International Conference on Computer Vision, Dec. 1, 2013, pp. 1-8.
Wiskott, et al., "Slow feature analysis: Unsupervised learning of invariances", In Journal of Neural Computation, vol. 14 Issue 4, Apr. 2002, 715-770 pages.
Yang, et al., "Craft Objects from Images", In Proceedings of IEEE Conference on Computer Vision and Pattern Recognition, Jun. 27, 2016, pp. 6043-6051.
Zeiler, et al., "Visualizing and understanding convolutional networks", In Proceedings 13th European Conference of Computer Vision, Sep. 6, 2014, pp. 818-833.
Zhang, et al., "Slow feature analysis for human action recognition", In Journal of IEEE Transactions on Pattern Analysis and Machine Intelligence, vol. 34, Issue 3, Mar. 2012, pp. 436-450.
Zheng, et al., "Conditional random fields as recurrent neural networks", In Proceedings of the IEEE International Conference on Computer Vision, Dec. 2015, pp. 1-17.
Zou, et al., "Deep learning of invariant features via simulated fixations in video", In Proceedings of the 25th International Conference on Neural Information Processing Systems, Dec. 3, 2012, pp. 1-9.
Zhu, et al., "Deep Feature Row for Video Recognition", In Journal of Computing Research Repository, Nov. 23, 2016, pp. 1-13.

* cited by examiner

FEATURE FLOW FOR VIDEO RECOGNITION

BACKGROUND INFORMATION

Digital images and video have become prevalent in modern society as well as the devices that capture them. Digital cameras are not only a commonly carried item, digital imaging devices are now utilized in many new ways and are embedded within many new devices and machines. Such widespread and common use of digital imaging devices creates a lot of data and a lot of opportunity to identify items of interest within individual images, either still or video frame images, or between two or more images or video frames. For example, video captured by an imaging device of an autonomous driving vehicle can be utilized to track a road, obstacles, and other vehicles on the road to assist in automated operation thereof. However, such image processing and flow tracking typically involves a great amount of data processing at least because of an amount of data to be processed in each image, a high number of images to be processed (e.g., 30 or 60 frames per second), and possibly a large number of items to identify and track in and between images. However, to these ends, deep convolutional neutral networks have achieved great success on image recognition tasks. Yet, it is nontrivial to transfer the state-of-the-art image recognition networks to videos as per-frame evaluation is too slow and computationally expensive.

DETAILED DESCRIPTION

Deep convolutional neutral networks have achieved great success on image recognition tasks. Yet, as mentioned above, it is nontrivial to transfer state-of-the-art image recognition networks to videos as per-frame evaluation can be slow and computationally expensive. The slowness and computational expense are of critical concern in many possible applications for feature flow in video recognition, such as in applications to autonomous driving vehicles, as human safety and property damage may be in the balance. Various embodiments herein each include at least one of systems, methods, and software for deep feature flow for video recognition. Such embodiments generally include a fast and accurate framework for video recognition. Some embodiments run an expensive convolutional sub-network only on sparse key frames and then propagates deep feature maps to other frames via a flow field. These embodiments achieve significant performance improvement in terms of processing speed for tracking features between video frames as flow computation is relatively fast. End-to-end training of the whole architecture in these embodiments significantly boosts the recognition accuracy providing for reliable and accurate tracking despite a reduction in image processing.

The deep feature flow processing of the embodiments herein is flexible and includes general solutions that may be applied in many contexts.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Recent years have witnessed significant success of deep convolutional neutral networks (CNNs) in various image recognition tasks, e.g., image classification, semantic segmentation, and object detection. With their rapidly increasing maturity, the recognition tasks have been extended from image domain to video domain, such as semantic segmentation on Cityscapes dataset, and object detection on ImageNet VID dataset. Fast and accurate visual recognition in videos is crucial to realize vision-based machine intelligence for high-value scenarios, e.g., autonomous driving, video surveillance, etc. Nevertheless, applying existing image recognition networks on all video frames introduces sometimes unaffordable computational cost in applications.

Image content varies slowly over consecutive video frames, especially the high-level semantics. This observation has is used as means of regularization in feature learning, considering videos as unsupervised data sources. Yet, such data redundancy and continuity can also be exploited to reduce the computation cost. This aspect, however, has received little attention for video recognition using CNNs.

Modern CNN architectures share a common structure. Most layers are convolutional and account for the most computation. The intermediate convolutional feature maps have the same spatial extent of the input image (usually at a smaller resolution, e.g., 16. smaller). They also preserve the spatial correspondences between the low-level image content and middle-to-high level semantic concepts. Such correspondence provides opportunities to cheaply propagate the features between nearby frames by spatial warping, similar to optical flow.

Figure 1:
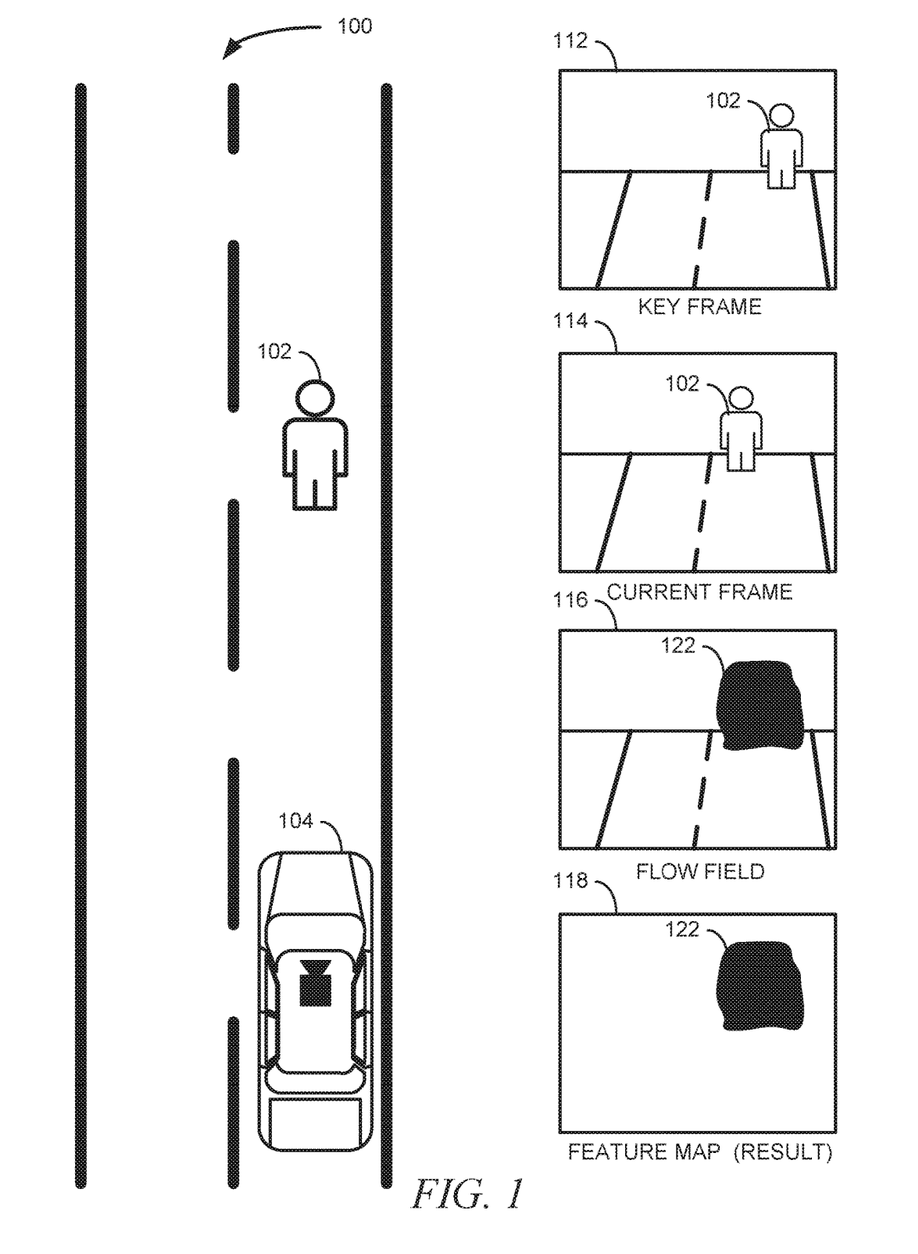
FIG. 1 is a scene illustration and example images captured thereof, according to an example embodiment.

Some embodiments here include deep feature flow, a fast and accurate approach for video recognition. These embodiments apply an image recognition network only on sparse key frames and propagates the deep feature maps from key frames to other frames via a flow field. The idea is illustrated in FIG. 1, which includes a scene illustration 100 and example images 112, 114, 116, 118 captured thereof, according to an example embodiment.

From an original, key frame 112 and a current frame 114, an intermediate feature map 118 responsive to a "person" 102 concept feature is illustrated showing the location of an isolated flow 122 of a person 102 feature identified by the person concept in the frames 112, 114 and isolated within the feature map 118. The person concept is located on the two nearby frames 112, 114 and a flow field 116. After propagation from the key frame 112 to the current frame 114, the propagated features are similar to the original features.

Typically, flow estimation and feature propagation are much cheaper than convolutions. Thus, the computational bottleneck is avoided and significant speedup during inference is achieved. When the flow field is also estimated by a network, the entire network architecture is trained end-to-end, with both image recognition and flow networks optimized for the recognition task. The recognition accuracy is significantly boosted.

In sum, deep feature flow is a fast, accurate, general, and an end-to-end framework for video recognition. It can adopt most state-of-the-art image recognition networks and can be applied for different recognition tasks. This is likely the first of such solutions to jointly train flow and video recognition in a deep learning framework. Extensive experiments have verified effectiveness of such embodiments on video object detection and semantic segmentation tasks, on large-scale video datasets. Compared to per-frame evaluation, the approach herein has achieved unprecedented speed (up to 10× faster, real time frame rate) with moderate accuracy loss (a few percent). The high performance facilitates video recognition tasks in practice.

Deep Feature Flow

In the following discussion, notation will be used as defined in Table 1.

TABLE 1

| Notations. Notations used herein | |
|---|---|
| k | key frame index |
| i | current frame index |
| r | per-frame computation cost ratio, Eq. (5) |
| l | key frame duration length |
| s | overall speedup ratio, Eq. (7) |
| $I_i$, $I_k$ | video frames |
| $y_i$, $y_k$ | recognition results |
| $f_k$ | convolutional feature maps on key frame |
| $f_i$ | propagated feature maps on current frame |
| $M_{i \to k}$ | 2D flow field |
| p, q | 2D location |
| $S_{i \to k}$ | scale field |
| N | image recognition network |

TABLE 1-continued

| Notations. Notations used herein | |
|---|---|
| $N_{feat}$ | sub-network for feature extraction |
| $N_{task}$ | sub-network for recognition result |
| F | flow estimation function |
| W | feature propagation function, Eq. (3) |

Given an image recognition task and a feed-forward convolutional neutral network N that outputs result for input image I as y=N(I). The goal of some embodiments is to apply the network to all video frames $I_i$, i=0, ..., ∞, fast and accurately.

Following modern CNN architectures and applications, without loss of generality, N is decomposed into two consecutive sub-networks. The first sub-network $N_{feat}$, dubbed feature network, is fully convolutional and outputs a number of intermediate feature maps, f=$N_{feat}$(I). The second sub network $N_{task}$, dubbed task network, has specific structures for the task and performs the recognition task over the feature maps, y=$N_{task}$(f).

Consecutive video frames are highly similar. The similarity is even stronger in the deep feature maps, which encode high level semantic concepts. Embodiments herein exploit the similarity to reduce computational cost. Specifically, the feature network $N_{feat}$ only runs on sparse key frames. The feature maps of a non-key frame $I_i$ are propagated from its preceding key frame $I_k$.

Figure 2:
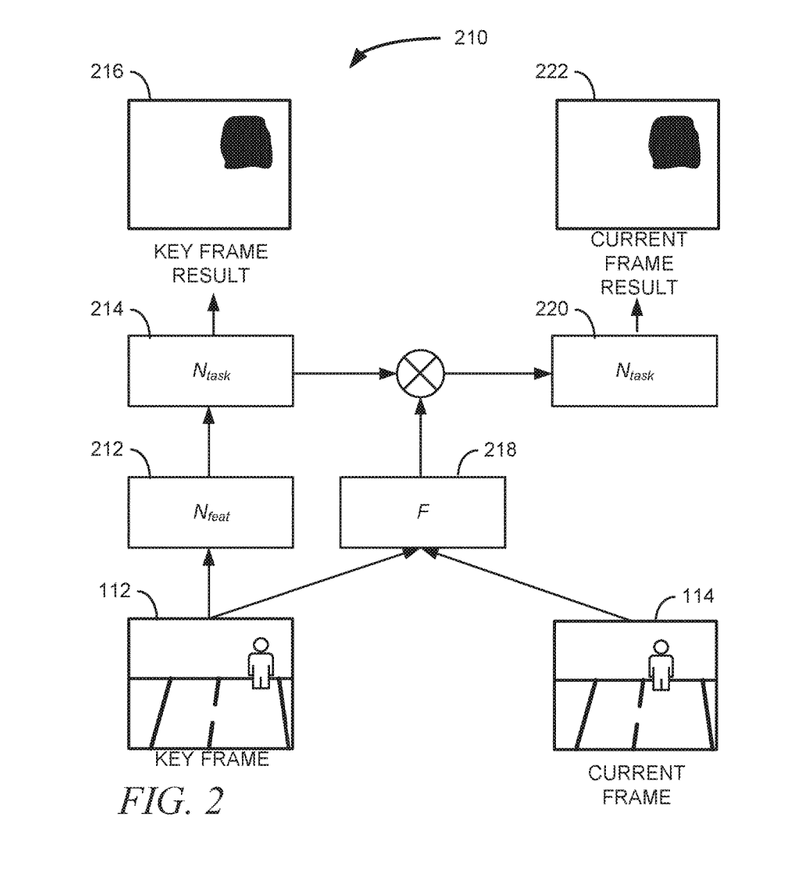
FIG. 2 logically illustrates two processing flows, according to example embodiments.

Turning now to FIG. 2, FIG. 2 logically illustrates two processing flows 200, 210, according to example embodiments. The first processing flow 200 illustrates video recognition using per-frame network evaluation while the second processing flow 210 illustrates an example of a deep feature flow embodiment.

In some embodiments, the features in the deep convolutional layers encode the semantic concepts and correspond to spatial locations in the image. Examples are illustrated in FIG. 1. Such spatial correspondence allows such embodiments to cheaply propagate the feature maps by the manner of spatial warping.

For example, let $M_{i \to k}$ be a two dimensional flow field. It may be obtained by a flow estimation algorithm F such as, $M_{i \to k}$=F($I_k$, $I_i$). It is bi-linearly resized to the same spatial resolution of the feature maps for propagation. It projects back a location p in a current frame i to the location p+δp in key frame k, where δp=$M_{i \to k}$(p).

As the values δp are in general fractional, the feature warping is implemented via bilinear interpolation:

$$f_i^c(p) = \sum_q G(q, p + \delta p) f_k^c(q), \quad (1)$$

where c identifies a channel in the feature maps f, q enumerates all spatial locations in the feature maps, and G(•,•) denotes the bilinear interpolation kernel. Note that G is two-dimensional and is separated into two one dimensional kernels as:

$$G(q,p+\delta p)=g(q_x,p_x+\delta p_x) \cdot g(q_y,p_y+\delta p_y), \quad (2)$$

where g(a, b)=max(0, 1−|a−b|).

Note that Eq. (1) is fast to compute as a few terms are non-zero.

The spatial warping may be inaccurate due to errors in flow estimation, object occlusion, etc. To better approximate the features in some embodiments, amplitudes of the features may be modulated by a "scale field" $S_{i \to k}$, which is of the same spatial and channel dimensions as the feature maps. The scale field may be obtained by applying a "scale function" S on the two frames, $S_{i \to k} = S(I_k, I_i)$.

Finally, a feature propagation function is defined as:

$$f_i = W(f_k, M_{i \to k}, S_{i \to k}), \quad (3)$$

where W applies Eq. (1) for all locations and all channels in the feature maps, and multiplies the features with scales $S_{i \to k}$ in an element-wise way. The video recognition algorithm above and as otherwise described herein may be referred to as feature flow or deep feature flow. It is summarized in Algorithm 1, below. Notice that any flow function F, such as the hand-crafted low-level flow (e.g., SIFT-Flow), is readily applicable. Training the flow function is not obligate, and the scale function S is set to ones everywhere.

---

Algorithm 1 Deep feature flow inference algorithm for video recognition.

```
1: input: video frames {I_i}
2: k = 0;                                      //initialize key frame
3: f_0 = N_feat (I_0)
4: y_0 = N_task (f_0)
5: for i = 1 to ∞ do
6:     if is_key_frame(i) then                 //key frame scheduler
7:         k = I                               //update the key frame
8:         f_k = N_feat(I_k)
9:         y_k = N_task(f_k)
10:    else                                    //use feature flow
11:        f_i = W(f_k, F(I_k, I_i), S(I_k, I_i))  //propagation
12:        y_i = N_task (f_i)
13:    end if
14: end for
15: output: recognition results {y_i}
```

---

Deep Feature Flow Training

A flow function may originally designed to obtain correspondence of low-level image pixels. Such a flow function can be fast in inference, but may not be accurate enough for the recognition task, in which the high-level feature maps change differently, usually slower than pixels. To model such variations, some embodiments also use a CNN to estimate the flow field and the scale field such that all the components can be jointly trained end-to-end for the task.

The architecture is illustrated in processing flow 210 of FIG. 2. Training is performed by Stochastic Gradient Descent (SGD). In each mini-batch, a pair of nearby video frames, $\{I_k, I_i\}$, $0 \le i-k \le 9$, are randomly sampled. (Note: The same notations are used for consistency although there is no longer the concept of "key frame" during training.). In the forward pass, feature network $N_{feat}$ is applied on $I_k$ to obtain the feature maps $f_k$. Next, a flow network F runs on the frames $I_i$, $I_k$ to estimate the flow field and the scale field. When i>k, feature maps $f_k$ are propagated to $f_i$ as in Eq. (3). Otherwise, the feature maps are identical and no propagation is done. Finally, task network $N_{task}$ is applied on $f_i$ to produce the result $y_i$, which incurs a loss against the ground truth result. The loss error gradients are back-propagated throughout to update all the components. Note that this training accommodates the special case when i=k and degenerates to the per-frame training as in the processing flow 200 where a current frame 114 is processed 202 to extract a feature, which may trigger or precede performance of a task 204 to reach a current frame result 206.

The flow network solution herein, such as the process flow 210, is much faster than the feature network, such as the process flow 206, as will be elaborated later. The flow network solution, such as the process flow 210, may be pre-trained on the known Flying Chairs dataset. The training may then add the scale function S as a sibling output at the end of the network, by increasing the number of channels in the last convolutional layer appropriately. The scale function may then be initialized to all ones (weights and biases in the output layer are initialized as 0s and 1s, respectively). The augmented flow network is then fine-tuned as in process flow 210.

Generally, the feature propagation function in Eq. (3) is unconventional. Eq. (3) is parameter free and fully differentiable. In back-propagation, the derivative of the features in $f_i$ is computed with respect to the features in $f_k$, the scale field $S_{i \to k}$, and the flow field $M_{i \to k}$. The first two are easy to compute using the chain rule. For the last, from Eq. (1) and Eq. (3), for each channel c and location p in current frame, we have:

$$\frac{\partial f_i^c(p)}{\partial M_{i \to k}(p)} = S_{i \to k}^c(p)_q \frac{\partial G(q, p + \delta p)}{\partial \delta p} f_k^c(q). \quad (4)$$

The term $$\frac{\partial G(q, p + \delta p)}{\partial \delta p}$$

can be derived from Eq. (2). Note that the flow field M(•) is two-dimensional and $\partial \delta p$ are used to denote $\partial \delta p_x$ and $\partial \delta p_y$ for simplicity.

The methods of some embodiments can be trained easily on datasets where only sparse frames are annotated, which is usually the case due to the high labeling costs in video recognition tasks. In this case, the per-frame training, such as in the process flow 200 of FIG. 2, can only use annotated frames, while deep feature flow, such as in the process flow 210, can easily use all frames as long as frame $I_i$ is annotated. In other words, deep feature flow embodiments can fully use the data even with sparse ground truth annotation. This is potentially beneficial for many video recognition tasks.

Inference Complexity Analysis

For each non-key frame, the computational cost ratio of the proposed approach (line 11-12 in Algorithm 1) and per-frame approach (line 8-9) may be:

$$r = \frac{O(F) + O(S) + O(W) + O(N_{task})}{O(N_{feat}) + O(N_{task})}, \quad (5)$$

where O(•) measures the function complexity.

To understand this ratio, first note that the complexity of $N_{task}$ is usually small. Although its split point in N is kind of arbitrary, it is sufficient to keep only one learnable weight layer in $N_{task}$ in our implementation. While both $N_{feat}$ and F have considerable complexity, we have $O(N_{task}) \ll O(N_{feat})$ and $O(N_{task}) \ll O(F)$.

We also have $O(W) \ll O(F)$ and $O(S) \ll O(F)$ because W and S are very simple. Thus, the ratio in Eq. (5) is approximated as:

$$r \approx \frac{O(F)}{O(N_{feat})}. \quad (6)$$

It is mostly determined by the complexity ratio of flow network F and feature network $N_{feat}$, which can be precisely measured, e.g., by their FLOPs. Table 2 shows its typical values in our implementation.

TABLE 2

The approximated complexity ratio in Eq. (6) for different feature network $N_{feat}$ and flow network F, measured by their FLOPs. See Section 4. Note that r ≪ 1 and we use 1/r here for clarity. A significant per-frame speedup factor is obtained.

|  | FlowNet | FlowNet Half | FlowNet Inception |
| --- | --- | --- | --- |
| ResNet-50 | 9.20 | 33.56 | 68.97 |
| ResNet-101 | 12.71 | 46.30 | 95.24 |

Compared to the per-frame approach, the overall speedup factor in Algorithm 1 also depends on the sparsity of key frames. Let there be one key frame in every l consecutive frames, the speedup factor is:

$$s = \frac{l}{1 + (l-1)*r}. \quad (7)$$

Key Frame Scheduling

As indicated in Algorithm 1 (line 6) and Eq. (7), a crucial factor for inference speed in some embodiments is when to allocate a new key frame. In some embodiments, a simple fixed key frame scheduling may be used, that is, the key frame duration length l is a fixed constant. This is easy to implement and tune. However, varied changes in image content may beg for a varying l to provide a smooth tradeoff between accuracy and speed. Ideally, a new key frame should be allocated when the image content changes drastically.

How to design effective and adaptive key frame scheduling can further improve some embodiments and there are other methods that may be implemented in that regard. Different video tasks may present different behaviors and requirements. Learning an adaptive key frame scheduler from data is an attractive choice.

Turning now in greater detail to FIG. 2 and the process flow 210, the illustrated process includes receiving a key frame 112, such as from a camera on a vehicle 104 of FIG. 1. The key frame 112 is then processed by a subnetwork for feature extraction 212 and is also forwarded to a flow estimation function 218. The subnetwork for feature extraction 212 may be one of many such subnetworks for feature extraction in a particular embodiment as there may be many features being considered. As such, the flow function 218 may be singular or plural in different embodiments as may be tailored for the processing demands and flow tracking demands of a particular embodiment.

The subnetwork for feature extraction 212 processes the image to extract a feature from the key frame 112 and then may forward the extracted feature to a sub-network for a task 214, such as performing a feature recognition, a person identification, reading a street sign, or other task and a key frame result 216 may be output.

A subsequent frame may be received that is not a key frame, so we will refer to it as a current frame 114. The current frame 114 is a frame that will not have feature extraction of the subnetwork for feature extraction 212 performed upon it. Instead, the current frame is forwarded to the flow estimation function 218 for processing along with the most recent key frame 112. The flow estimation function determines a flow from the key frame 112 to the current frame 114 to obtain a flow field, such as the flow field 116 of FIG. 1. The flow field may then combined with the output of the sub-network for a task 214 processing of the key frame 112 in some embodiments or processed independently by the same or another sub-network for a task 214 or 220 to obtain a current frame result 222.

Note that the initial portion of the key frame 112 processing sequence of the process flow 210 by a subnetwork for feature extraction 212 and a sub-network for a task 214 to obtain the key frame result 216 is the same as in the process flow 200.

Figure 3:
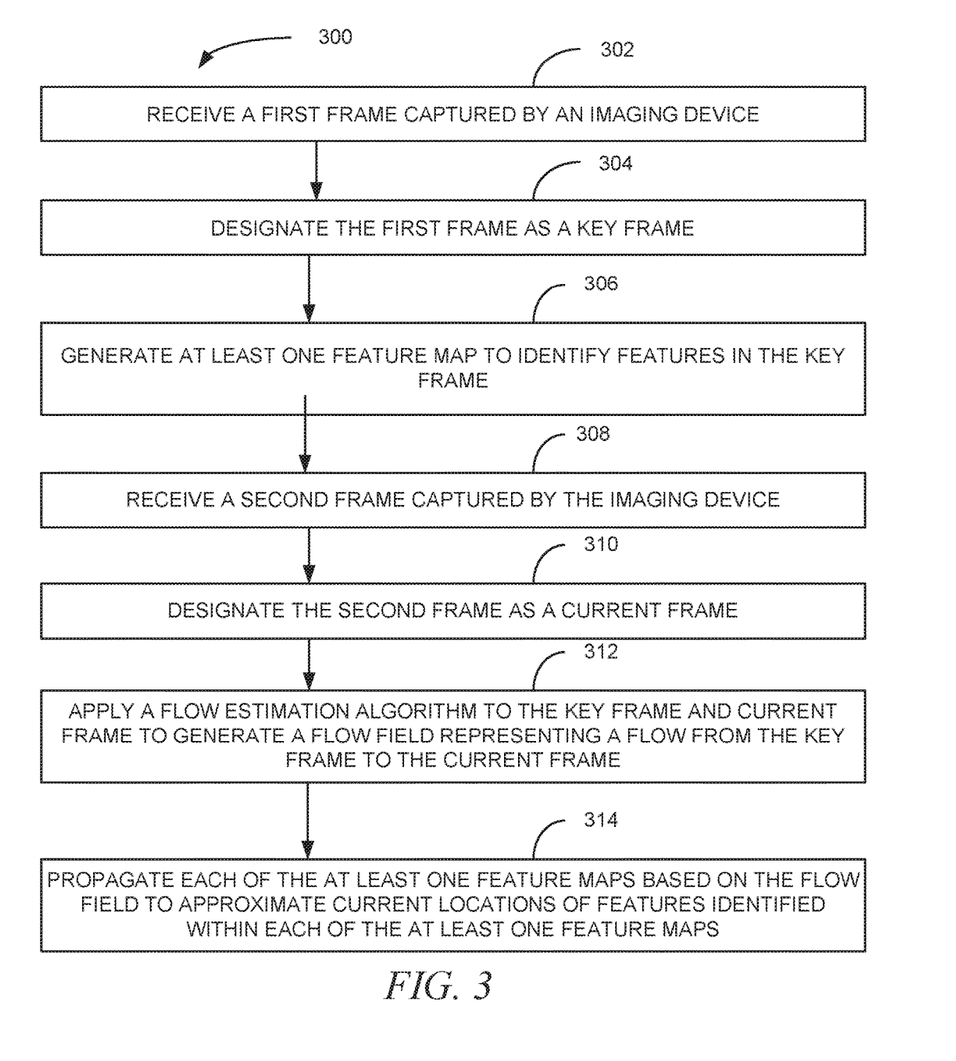
FIG. 3 is a block flow diagram of a method, according to an example embodiment.

FIG. 3 is a block flow diagram of a method 300, according to an example embodiment. The method 300 is an example of a method that may be performed by a computing device deployed on an vehicle that has autonomous drive capabilities, by a system that processes video for tracking objects, people, or other things moving through a scene, and the like.

The method 300 includes receiving 302 a first frame captured by an imaging device and designating 304 the first frame as a key frame. The method 300 may then generate 306 at least one feature map to identify features in the key frame and subsequently receive 308 a second frame captured by the imaging device. The method 300 also includes designating 310 the second frame as a current frame and applying 312 a flow estimation algorithm, such as the SIFT-flow function, to the key frame and current frame to generate a flow field representing a flow from the key frame to the current frame. The method 300 then propagates 314 each of the at least one feature maps based on the flow field to approximate current locations of features identified within each of the at least one feature maps.

Some embodiments of the method 300 may further perform a task with regard to a particular feature identified in either of the key frame or the currently frame. The task may include evaluation of a condition of the feature identified in feature maps generated from both the key frame and the current frame, where satisfaction of the condition causes a further portion of the task is to be performed. The task may include recording, as data in a memory device, a location of an identified feature, such as a location of a vehicle having a license plate that has been read by a task.

In some embodiments, frames are received 302 from the imaging device at a rate of a plurality of frames per second. In some such embodiments, the first frame received each second is designated 304 as the first frame and therefore the key frame. Each of the other frames may be designated 310 as second frames and therefore current frames.

In some embodiments of the method 300, generating 306 a feature map of the at least one feature maps includes applying a filter to the key frame to extract a feature of a feature map.

Figure 4:
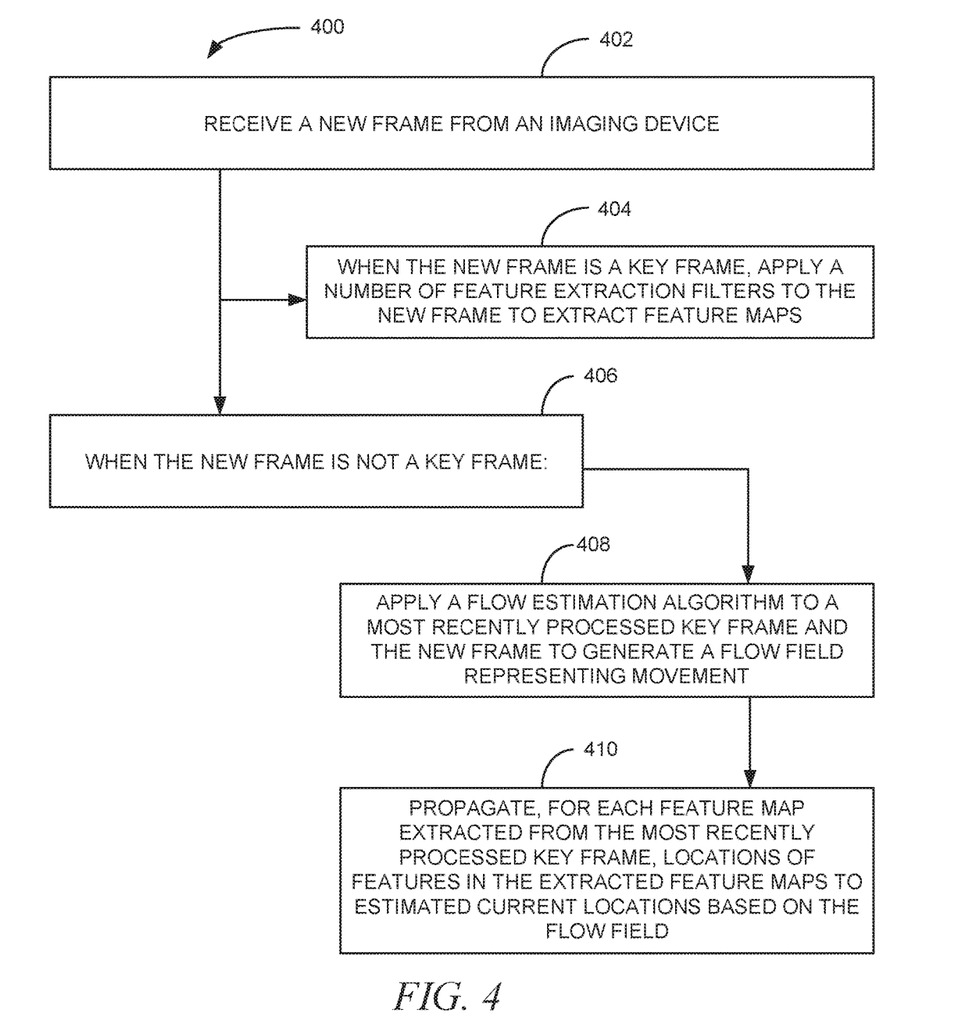
FIG. 4 is a block flow diagram of a method, according to an example embodiment.

FIG. 4 is a block flow diagram of a method 400, according to an example embodiment. The method 400 is another example embodiment that may be deployed similarly to the method 300 of FIG. 3.

The method 400 includes receiving 402 a new frame from an imaging device and when the new frame is a key frame, applying 404 a number of feature extraction filters to the new frame to extract feature maps. The method 400 otherwise, which is when 406 the new frame is not a key frame, applies 408 a flow estimation algorithm to a most recently processed key frame and the new frame to generate a flow field representing movement. The method 400 then proceeds to propagate 410, for each feature map extracted from the most recently processed key frame, locations of features in the extracted feature maps to estimated current locations based on the flow field. In some embodiments, the applying 408 of the flow estimation algorithm may be performed subsequent to a scaling function performed on the key and the new frames to place the key and the new frames in the same spatial and channel dimensions as the feature maps.

In some embodiments, subsequent to extracting 404, 410 the feature maps, for each extracted feature map, the method 400 may include performing a task associated with the feature extraction filter that extracted the respective feature map.

Figure 5:
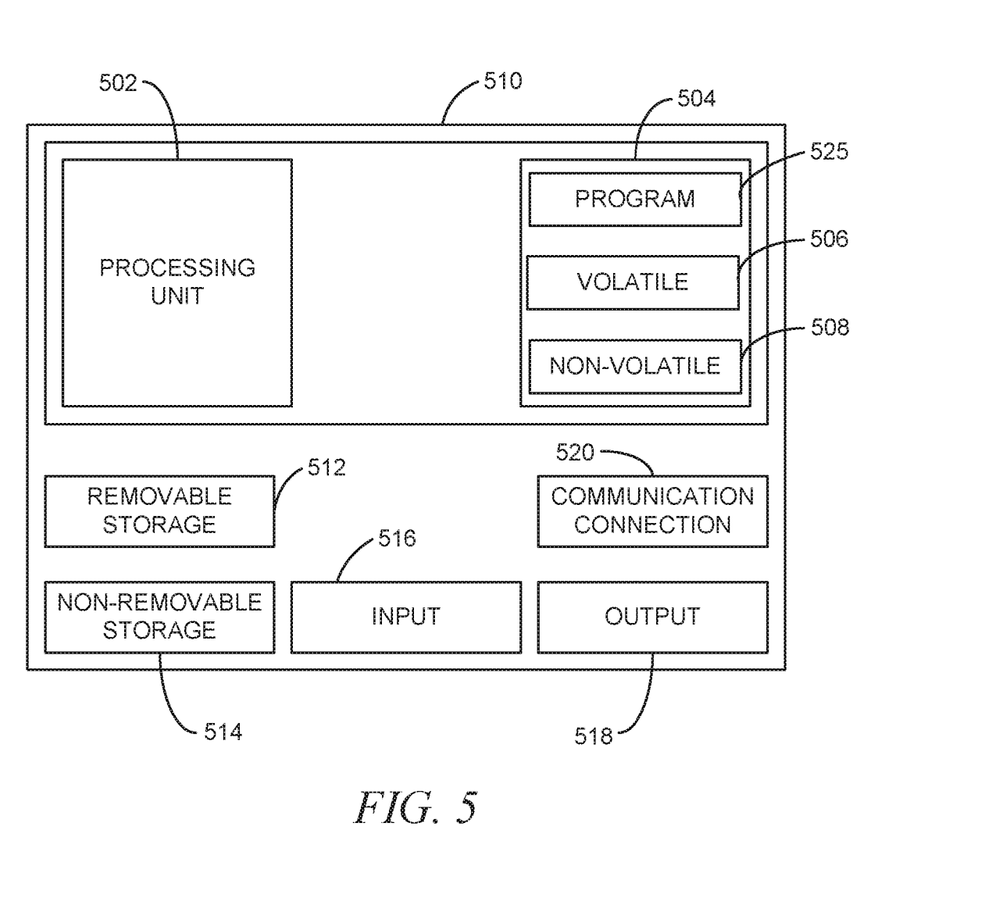
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Although the example computing device is illustrated and described as computer 510, the computing device may be in different forms in different embodiments. For example, the computing device may instead be a smartphone, a tablet, smartwatch, or other computing device including the same or similar elements as illustrated and described with regard to FIG. 5. Devices such as smartphones, tablets, and smartwatches are generally collectively referred to as mobile devices. In some embodiments, such as with regard to the vehicle 104 of FIG. 1, the computer 510 may be deployed therein to process images from one or more imaging devices present on the vehicle 104 according to one or more of the methods and processes described herein. Further, although the various data storage elements are illustrated as part of the computer 510, the storage may also or alternatively include cloud-based storage accessible via a network, such as the Internet.

Returning to the computer 510, memory 504 may include volatile memory 506 and non-volatile memory 508. Computer 510 may include—or have access to a computing environment that includes a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 510 may include or have access to a computing environment that includes input 516, output 518, and a communication connection 520. The input 516 may include one or more of a touchscreen, touchpad, mouse, keyboard, camera, one or more device-specific buttons, one or more sensors integrated within or coupled via wired or wireless data connections to the computer 510, and other input devices. The computer 510 may operate in a networked environment using a communication connection 520 to connect to one or more remote computers, such as database servers, web servers, and other computing device. An example remote computer may include a personal computer (PC), server, router, network PC, a peer device or other common network node, or the like. The communication connection 520 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 520 may also or alternatively include a transceiver device, such as a BLUETOOTH® device that enables the computer 510 to wirelessly receive data from and transmit data to other BLUETOOTH® devices.

Computer-readable instructions stored on a computer-readable medium are executable by the processing unit 502 of the computer 510. A hard drive (magnetic disk or solid state), CD-ROM, and RAM are some examples of articles including a non-transitory computer-readable medium. For example, various computer programs 525 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
receiving a first frame captured by an imaging device;
designating the first frame as a key;
generating at least one feature map to identify features in the key frame;
receiving a second frame captured by the imaging device;
designating the second frame as a current frame;
applying a flow estimation algorithm to the key frame and current frame to generate a flow field representing a flow from the key frame to the current frame; and
propagating each of the at least one feature maps based on the flow field to approximate current locations of features identified within each of the at least one feature maps; and
wherein frames are received from the imaging device at a rate of a plurality of frames per second and a time or frame count interval is set for when to re-designate the key frame to restart the method.

2. The method of claim 1, further comprising:
performing a task with regard to a particular feature identified in either of the key frame or the current frame.

3. The method of claim 2, wherein the task includes evaluation of a condition of the feature identified in feature maps generated from both the key frame and the current frame, where satisfaction of the condition causes a further portion of the task is to be performed.

4. The method of claim 2, wherein the task includes recording, as data in a memory device, a location of an identified feature.

5. The method of claim 1, wherein the first frame received each second is designated as the first frame and therefore the key frame and each of the other frames are designated as second frames and therefore current frames.

6. The method of claim 1, wherein generating a feature map of the at least one feature maps includes applying a filter to the key frame to extract a feature of a feature map.

7. The method of claim 1, wherein the flow estimation algorithm is the SIFT-Flow function.

8. A non-transitory computer-readable storage medium, with instructions stored thereon which when executed by at least one processor cause a computing device to perform data processing activities comprising:
 receiving a new frame from an imaging device;
 when the new frame is a key frame:
  applying a number of feature extraction filters to the new frame to extract feature maps; and
 when the new frame is not a key frame:
  applying a flow estimation algorithm to a most recently processed key frame and the new frame to generate a flow field representing movement; and
  propagating, for each feature map extracted from the most recently processed key frame, locations of features in the extracted feature maps to estimated current locations based on the flow field; and
 wherein received new frames are determined to be key frames based on a frame count or rate at which new frames are received in view of a designator that declares as key frames one or more of the new frames out of the frame count or the rate.

9. The non-transitory computer-readable storage medium of claim 8, wherein applying the flow estimation algorithm is performed subsequent to a scaling function performed on the key and the new frames to place the key and the new frames in the same spatial and channel dimensions as the feature maps.

10. The non-transitory computer-readable storage medium of claim 8, the data processing activities further comprising:
 subsequent to extracting the feature maps, for each extracted feature map, performing a task associated with the feature extraction filter that extracted the respective feature map.

11. The non-transitory computer-readable storage medium of claim 8, the data processing activities further comprising:
 subsequent to performance of the propagating, for each extracted feature map, performing the task associated with the feature extraction filter that extracted the respective feature map.

12. The non-transitory computer-readable storage medium of claim 11, wherein the task performed subsequent to the extracting of the feature maps or subsequent to performance of the propagating includes evaluation of a condition of a feature within in at least one feature map, where satisfaction of the condition causes a further portion of the task is to be performed.

13. The non-transitory computer-readable storage medium of claim 8, wherein the flow estimation algorithm is the SIFT-Flow function.

14. A computing device comprising:
 an imaging device;
 a processor;
 a memory device storing instructions executable by the processor to perform data processing activities, the data processing activities comprising:
  receiving a new frame from the imaging device;
  when the new frame is a key frame:
   applying a number of feature extraction filters to the new frame to extract feature maps; and
   for each extracted feature map, performing a task associated with the feature extraction filter that extracted the respective feature map;
  when the new frame is not a key frame:
   applying a flow estimation algorithm to a most recently processed key frame and the new frame to generate a flow field representing movement;
   propagating, for each feature map extracted from the most recently processed key frame, locations of features in the extracted feature maps to estimated current locations based on the flow field;
   for each extracted feature map, performing the task associated with the feature extraction filter that extracted the respective feature map; and
  wherein received new frames are determined to be key frames based on a frame count or rate at which new frames are received in view of a designator that declares as key frames one or more of the new frames out of the frame count or the rate.

15. The computing device of claim 14, wherein the computing device is coupled to or is a part of a machine that operates according to at least one variable input, wherein a specific task associated with at least one feature extraction filter includes an adjustment to at least one variable input of the machine.

16. The computing device of claim 15, wherein the specific task includes evaluation of a condition of a feature, where satisfaction of the condition influences the adjustment to at least one variable input of the machine.

17. The computing device of claim 14, wherein the applying of the flow estimation algorithm is performed subsequent to a scaling function performed on the key and the new frames to place the key and the new frames in the same spatial and channel dimensions as the feature maps.

\* \* \* \* \*